US007019057B2

(12) United States Patent
Seidel et al.

(10) Patent No.: US 7,019,057 B2
(45) Date of Patent: Mar. 28, 2006

(54) FLAMEPROOF POLYCARBONATE BLENDS

(75) Inventors: Andreas Seidel, Dormagen (DE); Thomas Eckel, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 92 days.

(21) Appl. No.: 10/770,006

(22) Filed: Feb. 2, 2004

(65) Prior Publication Data

US 2004/0176505 A1 Sep. 9, 2004

(30) Foreign Application Priority Data

Feb. 3, 2003 (DE) ................................ 103 04 159

(51) Int. Cl.
*C08K 5/523* (2006.01)

(52) U.S. Cl. ...................... 524/127; 524/140; 524/141; 524/145

(58) Field of Classification Search ................ 524/127, 524/140–141, 145
See application file for complete search history.

(56) References Cited

U.S. PATENT DOCUMENTS 5,204,394 A 4/1993 Gosens et al. .............. 524/125
5,292,786 A 3/1994 Gaggar et al. .............. 524/127
6,369,141 B1 4/2002 Ishii et al. .................. 524/127
6,423,766 B1 7/2002 Itagaki ....................... 524/127
6,423,767 B1 * 7/2002 Weber et al. ............... 524/158
2002/0077417 A1 6/2002 Itagaki ........................ 525/67
2002/0165300 A1 * 11/2002 Fujiguchi et al. ........... 524/141
2004/0039091 A1 2/2004 Eckel et al. ................ 524/121

FOREIGN PATENT DOCUMENTS

CA 2 368 188 10/2000
JP 7-316409 12/1995
JP 8-259791 10/1996
WO 00/39210 7/2000
WO 00/58395 10/2000

* cited by examiner

*Primary Examiner*—Peter Szekely
(74) *Attorney, Agent, or Firm*—Joseph C. Gil; Aron Preis

(57) ABSTRACT

A flame retardant, thermoplastic molding composition is disclosed. The composition contains A) at least one of aromatic polycarbonate and polyester carbonate, B) polyalkyl (alkyl)acrylate, C) a graft polymer the molecular structure of which is substantially free of units derived from styrene, butadiene and acrylonitrile, D) at least one organic phosphoric acid ester, E) an optional anti-drip agent, and F) optionally at least one polymer additive. The composition is characterized in its good property profile especially weld line strength, resistance to chemicals, elongation at break, thermal stability and melt flowability.

13 Claims, No Drawings

FLAMEPROOF POLYCARBONATE BLENDS

FIELD OF THE INVENTION

The invention relates to thermoplastic molding compositions and more particularly to flame resistant poly(ester) carbonate compositions.

SUMMARY OF THE INVENTION

A flame retardant, thermoplastic molding composition is disclosed. The composition contains A) at least one of aromatic polycarbonate and polyester carbonate, B) polyalkyl (alkyl)acrylate, C) a graft polymer the molecular structure of which is substantially free of units derived from styrene, butadiene and acrylonitrile, D) at least one organic phosphoric acid ester, E) an optional anti-drip agent, and F) optionally at least one polymer additive. The composition is characterized in its good property profile especially weld line strength, resistance to chemicals, elongation at break, thermal stability and melt flowability.

BACKGROUND OF THE INVENTION

Halogen-free flameproof polycarbonate blends are known. U.S. Pat. No. 5,204,394 describes for example polymer mixtures of polycarbonate, a styrene-containing copolymer and/or a styrene-containing graft polymer that have been rendered flameproof with oligomeric phosphoric acid esters. Examples of such polymer mixtures are PC/ABS blends and PC/HIPS blends.

For some applications it is desirable to provide compositions with comparable or improved properties that do not contain polymer components in whose structure styrene, butadiene and/or acrylonitrile are involved as monomer components. Such polymers and therefore also the compositions containing these polymers always contain, due to their production, traces of residual monomers including styrene, butadiene and acrylonitrile, which are regarded as critical for the use of the products produced therefrom in some applications.

In JP-A 08 259 791 and JP-A 07 316 409 compositions are described that contain, in addition to polycarbonate, also a methyl methacrylate (MMA)-grafted silicone/acrylate composite rubber, a monomeric or oligomeric phosphoric acid ester, and polytetrafluoroethylene (PTFE). These compositions are flameproof and have a high notched impact strength. The flowability of such compositions is however as a rule insufficient, especially if in order to achieve a good resistance to chemicals a polycarbonate with a sufficiently high molecular weight is used, and to achieve a satisfactory thermal stability a sufficiently small phosphoric acid ester fraction is employed. Similar comments apply to the compositions that are described in U.S. Pat. No. 6,423,766 B1 and U.S. Pat. No. 6,369,141 B1.

EP-A 0 463 368 describes compositions of polycarbonate, PMMA, ABS and a monomeric phosphoric acid ester that are flameproof and are characterized by an improved flow line strength. These compositions do not however satisfy the aforementioned desire for materials that are free of styrene, butadiene and acrylonitrile.

The object of the present invention was to provide flameproof polycarbonate compositions that do not contain any polymers built up from any of butadiene, styrene and acrylonitrile and are thus free of butadiene, acrylonitrile and styrene residual monomers, and that are characterized by a good property combination of improved flow line strength, resistance to chemicals, elongation at break and thermal stability with, compared to equivalent PC+ABS compositions, an unchanged good processability in injection molding processes, i.e. that are characterized by melt flowability and flame resistance.

DETAILED DESCRIPTION OF THE INVENTION

It has now surprisingly been found that compositions of aromatic polycarbonate, graft polymers based on butadiene-free and styrene-free rubbers as graft base and a styrene-free and acrylonitrile-free graft shell (grafted phase) based on alkyl (meth)acrylates, phosphorus compounds as flameproofing agents and (co)polymers based on alkyl (meth) acrylates and fluorinated polyolefins that are preferably used as master batch with (co)polymers based on alkyl (meth) acrylates as matrix, have the desired property profile.

The present invention accordingly provides compositions containing

A) aromatic polycarbonate or polyester carbonate or mixtures thereof,

B) polyalkyl (alkyl)acrylate, preferably more poly($C_1$–$C_4$-aalkyl)acrylic, more $C_1$–$C_8$-alkylester, preferably polyalkyl methacrylate, in particular polymethyl methacrylate (PMMA), C) graft polymers in the molecular structure of which is substantially free of units derived from styrene, butadiene and acrylonitrile , preferably alkyl (alkyl)acrylate-grafted silicone, acrylate or silicone-acrylate composite rubbers, D) organic phosphoric acid esters, preferably oligomeric phosphoric acid esters, in particular those that are bridged with bisphenolic compounds, and E) optionally anti-drip agents (that is drip suppressants), preferably fluorinated polyolefins, which are preferably used as master batch in (co)polymers based on alkyl (alkyl)acrylates.

The compositions may furthermore contain conventional polymer additives (component F).

The compositions preferably contain

A) 40 to 95, preferably 50 to 90, in particular 60 to 90 parts by weight, most particularly preferably 65 to 85 parts by weight of aromatic polycarbonate and/or polyester carbonate, B) 0.1 to 25, preferably 0.5 to 20, in particular 1 to 10 and most particularly preferably 1 to 6 parts by weight of polyalkyl (alkyl)acrylate, preferably polyalkyl methacrylate, in particular polymethyl methacrylate, C) 0.1 to 25, preferably 0.5 to 20, in particular 1 to 15 and most particularly preferably 1 to 10 parts by weight of graft polymer the molecular structure of which is substantially free of units derived from styrene, butadiene and acrylonitrile, preferably an alkyl (alkyl)acrylate-grafted silicone, acrylate or silicone-acrylate composite rubber, and D) 0.2 to 30, preferably 0.5 to 25, in particular 1 to 20 and most particularly preferably 2 to 17 parts by weight of phosphoric acid esters, preferably oligomeric phosphoric acid esters, in particular those that are bridged with bisphenolic compounds, and E) 0 to 2, preferably 0 to 1, in particular 0.1 to 1 part by weight, most particularly preferably 0.2 to 0.5 part by weight of anti-drip agents, preferably fluorinated polyolefins, which are preferably used as master batch in (co) polymers based on alkyl (alkyl)acrylates, wherein the compositions according to the invention are free from monomeric butadiene, acrylonitrile and styrene or butadiene, acrylonitrile and styrene bonded in polymeric constituents, and the sum total of the parts by weight of all above-listed and optionally further components is standardised to 100.

Within the context of the present invention compositions are regarded as free from butadiene, styrene and acrylonitrile if the total content of these compounds, i.e. the sum total of the corresponding constituents present as residual monomer and of the corresponding constituents present in bound form in the polymer, does not exceed 0.5 wt. %, preferably 0.2 wt. %, in particular 0.1 wt. % and particularly preferably 0.05 wt. %, in each case referred to the weight of the composition.

The compositions according to the invention preferably contain no halogen-containing compounds such as for example aromatic polycarbonates or epoxy resins based on halogenated bisphenols, and no halogenated flameproofing agents.

Component A

Suitable aromatic polycarbonates and/or aromatic polyester carbonates of component A according to the invention are known in the literature or may be produced by processes known in the literature (for the production of aromatic polycarbonates see for example Schnell, "Chemistry and Physics of Polycar-bonates", Interscience Publishers, 1964 as well as DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates is carried out for example by a melt process or by reacting diphenols with carbonic acid halides, preferably phosgene, and/or with aromatic dicarboxylic acid dihalides, preferably benzenedicarboxylic acid dihalides, according to the phase interface process, optionally with the use of chain terminators, for example monophenols, and optionally with the use of trifunctional or higher functional branching agents, for example triphenols or tetraphenols.

Diphenols suitable for the production of the aromatic polycarbonates and/or aromatic polyester carbonates are preferably those of the formula (I)

(I)

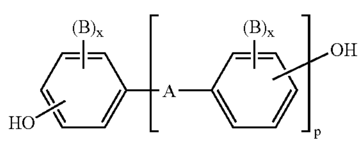

in which

A denotes a single bond, $C_1$ to $C_5$-alkylene, $C_2$ to $C_5$-alkylidene, $C_5$ to $C_6$-cycloalkylidene, —O—, —SO—, —CO—, —S—, —$SO_2$—, $C_6$ to $C_{12}$-arylene, onto which further aromatic rings, optionally containing heteroatoms, may be condensed, or a radical of the formula (II) or (III)

(II)

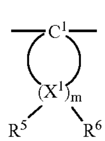

-continued (III)

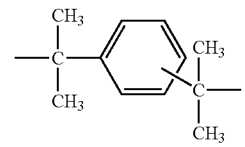

B in each case denotes $C_1$ to $C_{12}$-alkyl, preferably methyl, x in each case independently of one another denotes 0, 1 or 2, p is 1 or 0, and $R^5$ and $R^6$ individually selected for each $X^1$, and independently of one another denote hydrogen or $C_1$ to $C_6$-alkyl, preferably hydrogen, methyl or ethyl, $X^1$ denotes carbon, and m is a whole number from 4 to 7, preferably 4 or 5, with the proviso that on at least one atom $X^1$, both $R^5$ and $R^6$ are alkyl groups.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropylbenzenes.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone. Most particularly preferred is 2,2-bis(4-hydroxy-phenyl)-propane (bisphenol A).

The diphenols may be used individually or as arbitrary mixtures with one another. The diphenols are known in the literature or may be obtained by processes known in the literature.

Suitable chain terminators for the production of the thermoplastic, aromatic polycarbonates include for example phenol, p-tert.-butylphenol, as well as long-chain alkylphenols such as 4-(1,3-tetramethylbutyl)-phenol according to DE-A 2 842 005, or monoalkylphenols or dialkylphenols with a total of 8 to 20 carbon atoms in the alkyl substituents, such as 3,5-di-tert.-butylphenol, p-iso-octylphenol, p-tert.-octylphenol, p-dodecylphenol, and 2-(3,5-dimethylheptyl)-phenol and 4-3,5-dimethylheptyl)-phenol. The amount of chain terminators to be used is in general between 0.5 mole % and 10 mole %, referred to the molar sum of the diphenols used in each case.

The thermoplastic, aromatic polycarbonates may be branched in a known manner, and more specifically preferably by the incorporation of 0.05 to 2.0 mole %, referred to the sum of the diphenols used, of trifunctional or higher than trifunctional compounds, for example those with three and more phenolic groups.

Both homopolycarbonates as well as copolycarbonates are suitable. For the production of copolycarbonates of component A according to the invention there may also be used 1 to 25 wt. %, preferably 2.5 to 25 wt. % referred to the total amount of diphenols used, of polydiorganosiloxanes with hydroxyaryloxy terminal groups. These are known (for example from U.S. Pat. No. 3,419,634) and/or may be prepared according to processes known in the literature. The production of polydiorgano-siloxane-containing copolycarbonates is described in DE-A 3 334 782.

Preferred polycarbonates include, besides the bisphenol A homopolycarbonates, also the copolycarbonates of bisphenol A with up to 15 mole %, referred to the molar sum of diphenols, of other than preferred or particularly preferred aforementioned diphenols.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid. Particularly preferred are mixtures of the diacid dichlorides of isophthalic acid and terephthalic acid in a ratio between 1:20 and 20:1.

In the production of polyester carbonates a carbonic acid halide, preferably phosgene, is used as an additional bifunctional acid derivative.

As suitable chain terminators for the production of the aromatic polyester carbonates there may be used, apart from the already mentioned monophenols, also their chlorocarbonic acid esters as well as the acid chlorides of aromatic monocarboxylic acids that may optionally be substituted by $C_1$ to $C_{22}$-alkyl groups, as well as aliphatic $C_2$ to $C_{22}$-monocarboxylic acid chlorides.

The amount of chain terminators is in each case 0.1 to 10 mole %, referred in the case of phenolic chain terminators to moles of diphenol, and in the case of monocarboxylic acid chloride chain terminators, to moles of dicarboxylic acid dichlorides.

The aromatic polyester carbonates may also contain incorporated aromatic hydroxycarboxylic acids.

The aromatic polyester carbonates may be linear as well as, in a known manner, branched (see in this connection DE-A 2 940 024 and DE-A 3 007 934).

As branching agents there may for example be used trifunctional or higher functional carboxylic acid chlorides such as trimesic acid trichloride, cyanuric acid trichloride, 3,3',4,4'-beiizophenonetetracarboxylic acid tetrachloride, 1,4,5,8-naphthalenetetra-carboxylic acid tetrachloride or pyromellitic acid tetrachloride, in amounts of 0.01 to 1.0 mole % (referred to dicarboxylic acid dichlorides used) or trifunctional or higher functional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxypthenyl)-benzene, 1,1,1-tri-(4-hydroxyphenyl)-ethane, tri-(4-hydroxyphenyl)-phenylmethane, 2,2-bis[4,4-bis-(4-hydroxyphenyl)cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxy-phenyl)-propane, tetra-(4-[4-hydroxyphenylisopropyl]-phenoxy)-methane, 1,4-bis-[4,4'-dihydroxytriphenyl)methyl]-benzene, in amounts of 0.01 to 1.0 mole %, referred to diphenols used. Phenolic branching agents may be added together with the diphenols, while acid chloride branching agents may be introduced together with the acid dichlorides.

The proportion of carbonate structural units may vary arbitrarily in the thermoplastic, aromatic polyester carbonates. The proportion of carbonate groups is preferably up to 100 mole %, in particular up to 80 mole %, particularly preferably up to 50 mole %, referred to the sum total of ester groups and carbonate groups. Both the ester fraction as well as the carbonate fraction of the aromatic polyester carbonates may be present in the form of blocks or randomly distributed in the polycondensate.

The thermoplastic, aromatic poly(ester) carbonates preferably have weight average molecular weights (Mw measured by gel permeation chromatography) of ≦18,000, preferably≦23,000, in particular>25,000 g/mole. Poly(ester) carbonates with a weight average molecular weight of up to 40,000, preferably up to 35,000 and particularly preferably up to 33,000 g/mole are preferably used according to the present invention.

The thermoplastic, aromatic poly(ester) carbonates may be used alone or in arbitrary mixtures.

Component B

Preferred polyalkyl (alkyl)acrylates are polyalkyl methacrylates with 1 to 8, preferably 1 to 4 carbon atoms in the alkyl radical, in particular polymethyl methacrylate and polyethyl methacrylate. The polyalkyl (alkyl)acrylate may be present as a homopolymer or copolymer. In general polymethyl methacrylates are commercially obtainable.

Polyalkyl (alkyl)acrylates that are preferably used are those having a relatively low molecular weight polymers with a melt flow rate MVR measured at 230° C. and 3.8 kg plunger load of at least 8 $cm^3$/10 minutes, preferably at least 10 $cm^3$/10 minutes.

Component C

Graft polymers with a core/shell structure are preferably used as graft polymers C. Suitable graft bases C.1 are for example acrylate, polyurethane, silicone as well as silicone-acrylate composite rubbers.

Acrylate rubbers, silicone rubbers and silicone-acrylate composite rubbers are preferred. Silicone-acrylate composite rubbers are particularly preferred.

These graft bases generally have a mean particle size ($d_{50}$ value) of 0.01 to 5 μm, preferably 0.05 to 2 μm, in particular 0.1 to 1 μm.

The mean particle size $d_{50}$ is the diameter above and below which in each case 50% of the particles lie, and may be determined by means of ultracentrifuge measurements (W. Scholtan, H. Lange, Kolloid, Z. and Z. Polymere 250 (1972), 782–1796).

The gel content of these graft bases is at least 30 wt. %, preferably at least 40 wt. % (measured in toluene).

The gel content is determined at 25° C. in a suitable solvent (M. Hoffmann, H. Krömer, R. Kuhu, Polymeranalytik I and II, Georg Thieme-Verlag, Stuttgart 1977).

Particularly preferred as graft base C.1 are those acrylate rubbers, silicone rubbers or silicone-acrylate composite rubbers suitable for the graft polymers with a core/shell structure C, containing 0 to 100 wt. %, preferably 1 to 99 wt. %, in particular 10 to 99 wt. % and particularly preferably 30 to 99 wt. % of polyorganosiloxane component and 100 to 0 wt. %, preferably 99 to 1 wt. %, in particular 90 to 1 wt. % and particularly preferably 70 to 1 wt. % of polyalkyl (meth) acrylate rubber component (the total amount of the respective rubber components totals 100 wt. %).

Preferred silicone-acrylate rubbers that may be used are those whose production is described in JP 08 259 791-A, JP 07 316 409-A, EP-A 0 315 035and U.S. Pat. No. 4,963,619 the indicated equivalent of EP 315035 are incorporated herein by reference.

The polyorganosiloxane component in the silicone-acrylate composite rubber may be produced by reacting an organosiloxane and a multifunctional crosslinking agent in an emulsion polymerization process. It is also possible to incorporate graft-active sites into the rubber by adding suitable unsaturated organosiloxanes.

The organosiloxane is generally cyclic, the ring structures preferably containing 3 to 6 Si atoms. There may for example be mentioned hexamethylcyclotrisiloxane, octamethylcyclotetrasiloxane, decamethylcyclopentasiloxane, dodecamethylcyclohexa-siloxane, trimethyltriphenylcyclotrisiloxane, tetramethyltetraphenylcyclotetrasiloxane and octaphenylcyclotetrasiloxane, which may be used individually or as a mixture of two or more compounds. The organosiloxane component is included in the structure of the silicone fraction in the silicone-acrylate rubber in an amount of at least 50 wt. %, preferably at least 70 wt. %, referred to the silicone fraction in the silicone-acrylate rubber.

3- or 4-functional silane compounds are generally used as crosslinking agents. The following particularly preferred compounds may be mentioned by way of example: trimethoxymethylsi lane, triethoxyphenylsilane, tetramethoxysilane, tetraethoxysilane, tetra-n-propoxysilane, tetrabutoxysilane and 4-functional branching agents, in particular tetraethoxysilane. The amount of branching agent is generally 0 to 30 wt. % (referred to the polyorganosiloxane component in the silicone-acrylate rubber).

Compounds that form one of the following structures are preferably used to incorporate graft-active sites in the polyorganosiloxane component of the silicone-acrylate rubber:

(GI-1)

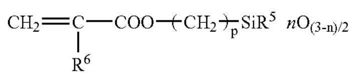

(GI-2)

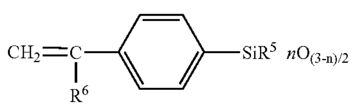

(GI-3)

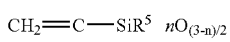

(GI-4)

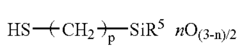

wherein $R^5$ denotes methyl, ethyl, propyl or phenyl, $R^6$ denotes hydrogen or methyl, n is 0,1 or 2, and p is 1 to 6.

(Meth)acryloyloxysilane is a preferred compound for the formation of the structure (GI-1). Preferred (meth)acryloyloxysilanes include for example β-methacryloyl-oxyethyl-dimethoxy-methylsilane, γ-methacryloyl-oxy-propyl-methoxy-dimethyl-silane, γ-methacryloyloxypropyl-dimethoxy-methylsilane, γ-methacryloyloxypropyl-trimethoxy-silane, γ-methacryloyloxy-propyl-ethoxy-diethyl-silane, γ-methacryloyl-oxypropyl-diethoxy-methylsilane, γ-methacryloyloxy-butyl-diethoxy-methylsilane.

Vinylsiloxanes, in particular tetramethyl-tetravinyl-cyclotetrasiloxane, are suitable for forming the structure GI-2.

For example, p-vinylphenyl-dimethoxy-methylsilane may form the structure GI-3. γ-mercaptopropyldimethoxy-methylsilane, γ-mercaptopropylmethoxy-dimethylsilane, γ-mercaptopropyldiethoxymethylsilane may form the structure GI-4.

The amount of these compounds is 0 to 10 wt. %, preferably 0.5 to 5 wt % (referred to the polyorganosiloxane component).

The acrylate component in the silicone-acrylate composite rubber may be produced from alkyl (meth)acrylates, crosslinking agents and graft-active monomer units.

As alkyl (meth)acrylates the following may be mentioned by way of example and are preferred: alkyl acrylates such as methyl acrylate, ethyl acrylate, n-propyl acrylate, n-butyl acrylate, 2-ethylhexyl acrylate and alkyl methacrylates such as hexyl methacrylate, 2-ethylhexyl methacrylate and n-lauryl methacrylate; n-butyl acrylate is particularly preferred.

Multifunctional compounds may be used as crosslinking agents. The following may be mentioned by way of example: ethylene glycol dimethacrylate, propylene glycol dimethacrylate, 1,3-butylene glycol dimethacrylate and 1,4-butylene glycol dimethacrylate.

The following compounds may be used for example, individually or as a mixture, for forming graft-active sites: allyl methacrylate, triallyl cyanurate, triallyl isocyanurate and allyl methacrylate. Allyl methacrylate may also act as crosslinking agent. These compounds are used in amounts of 0.1 to 20 wt. % referred to the acrylate rubber component in the silicone-acrylate composite rubber.

Methods for the production of the silicone-acrylate composite rubbers preferably used in the compositions according to the invention as well as their grafting with monomers are described for example in U.S. Pat. No. 4,888,388, JP 08 259 791 A2, JP 07 316 409A and EP-A 0 315 035. As graft base C.1 for the graft polymer C there may be used those silicone-acrylate composite rubbers whose silicone and acrylate components form a core/shell structure, as well as those that form a network in which the acrylate and silicone components completely interpenetrate one another (interpenetrating network).

The graft polymerization on the aforedescribed graft bases may be carried out in suspension, dispersion or emulsion. Continuous or batchwise emulsion polymerization is preferred. This graft polymerization is carried out using free-radical initiators (e.g. peroxides, azo compounds, hydroperoxides, persulfates, perphosphates) and optionally with the use of anionic emulsifiers, for example carboxonium salts, sulfonic acid salts or organic sulfates. In this way graft polymers are formed with high graft yields, i.e. a large proportion of the polymer of the graft monomers is chemically bonded to the rubber.

The graft shell C.2 is formed from (meth)acrylic acid ($C_1$–$C_8$) alkyl esters, preferably methyl methacrylate, n-butyl acrylate and/or tert.-butyl acrylate.

Particularly preferably the graft shell consists of one or a mixture of several pure (meth)acrylic acid ($C_1$–$C_8$) alkyl esters, in particular of pure methyl methacrylate.

Component D

The preferred flame-retardant additives are halogen-free oligomeric phosphoric acid and phosphonic acid esters of the general formula (IV)

(IV)

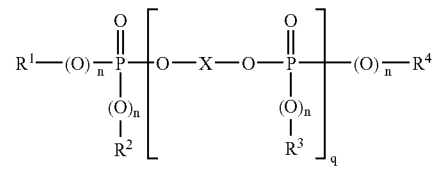

wherein $R^1$, $R^2$, $R^3$ and $R^4$ independently of one another denote $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, preferably $C_1$ to $C_4$-alkyl, n independently of one another is 0 or 1 q is 0 to 30, and

X denotes a mononuclear or polynuclear aromatic radical with 6 to 30 C atoms, or a linear or branched aliphatic radical with 2 to 30 C atoms, which may be OH-substituted and may contain up to 8 ether bonds.

Preferably $R^1$, $R^2$, $R^3$ and $R^4$ independently of one another denote $C_1$ to $C_4$-alkyl, phenyl, naphthyl or phenyl-$C_1$–$C_4$-alkyl. The aromatic groups $R^1$, $R^2$ $R^3$ and $R^4$ may in turn be substituted by alkyl groups, preferably $C_1$ to $C_4$-alkyl. Particularly preferred aryl radicals are cresyl, phenyl, xylenyl, propylphenyl or butylphenyl.

X in the formula (IV) preferably denotes a mononuclear or polynuclear aromatic radical with 6 to 30 C atoms. This is preferably derived from diphenols of the formula (I).

n in the formula (IV) may independently of one another be 0 or 1, and n is preferably equal to 1.

q denotes values from 0 to 30, preferably 0.5 to 15, particularly preferably 0.8 to 10, especially 1 to 5, and most particularly preferably 1 to 2, x preferably denotes

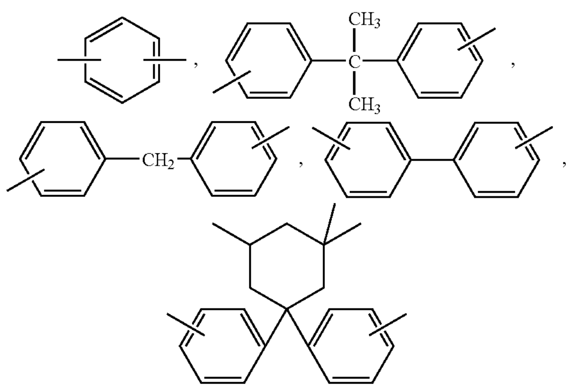

and in particular X is derived from resorcinol, hydroquinone, bisphenol A or diphenylphenol. Particularly preferably X is derived from bisphenol A.

Further preferred phosphorus-containing compounds are compounds of the formula (IVa)

(IVa)

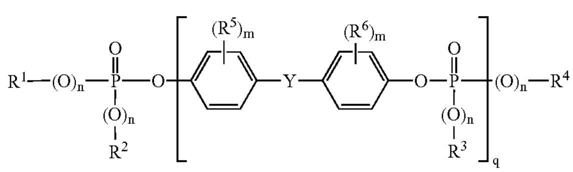

in which $R^1$, $R^2$, $R^3$, $R^4$, n and q have the meanings given in formula (IV), m independently of one another is 0, 1 or 2, $R^5$ and $R^6$ independently of one another denote $C_1$ to $C_4$-alkyl, preferably methyl or ethyl, and Y denotes $C_1$ to $C_7$-alkylidene, $C_1$ to $C_7$-alkylene, $C_5$ to $C_{12}$-cycloalkylene, $C_5$ to $C_{12}$-cycloalkylidene, —O—, —S—, —$SO_2$— or —CO—, preferably isopropylidene or methylene.

Particularly preferred is

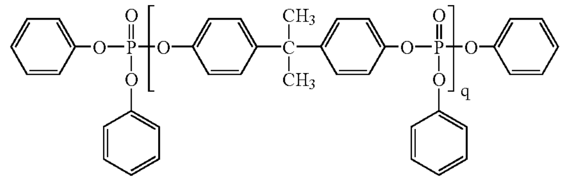

where q=1 to 2.

The phosphorus compounds according to component D are known (see for example EP-A 0 363 608, EP-A 0 640 655) or may be produced in a similar manner by known methods (see for example Ullmanns Enzyklopadie der Technischen Chemie, Vol. 18, p. 301 ff. 1979; Houben-Weyl, Methoden der Organischen Chemie, Vol. 12/1, p. 43; Beilstein Vol. 6, p. 177).

The mean q values may be found by determining the composition of the phosphate mixture (molecular weight distribution) by means of suitable methods (gas chromatography (GC), high pressure liquid chromatography (HPLC), gel permeation chromatography (GPC)) and calculating therefrom the mean values for q.

Component E

The flameproofing agents corresponding to component D are often used in combination with so-called anti-drip agents, which reduce the tendency of the material to form burning droplets in the event of fire. By way of example there may be mentioned here compounds from the classes of substances comprising fluorinated polyolefins, silicones as well as aramide fibres. These may also be employed in the compositions according to the invention. Fluorinated polyolefins are preferably used as anti-drip agents.

Fluorinated polyolefins are known and are described for example in EP-A 0 640 655. They are marketed by DuPont, for example under the trade name Teflon® 30N.

The fluorinated polyolefins may be used in the pure form. However, they are preferably used in the form of a master batch.

As master batch there may be used for example coagulated mixtures of emulsions of the fluorinated polyolefins with emulsions of the graft polymers (component C) or with emulsions of an acrylate-based (co)polymer (component B), wherein the fluorinated polyolefin is mixed as an emulsion with an emulsion of the graft polymer or of the copolymer and is then coagulated.

Furthermore, the master batches may be prepared by precompounding the fluorinated polyolefins with the graft polymer (component C) or (co)polymer (component B), preferably polymethyl methacrylate. The fluorinated polyolefins are mixed as powder with a powder or granular material of the graft polymer or copolymer and compounded in the melt in general at temperatures from 200° to 330° C. in conventional equipment such as internal kneaders, extruders or double-shaft screw extruders.

The master batches may furthermore be prepared by emulsion polymerization of at least one alkyl (alkyl)acrylate monomer in the presence of an aqueous dispersion of the fluorinated polyolefin. After precipitation with acid and subsequent drying, the polymer is used as a flowable powder.

The master batches usually have solids contents of fluorinated polyolefin of 5 to 95 wt. %, preferably 7 to 80 wt. %.

The fluorinated polyolefins may preferably be used in concentrations of 0 to 2 parts by weight, preferably 0 to 1 part by weight, in particular 0.1 to 1 part by weight and most particularly preferably 0.2 to 0.5 part by weight, these quantitative figures referring to the pure fluorinated polyolefin in the case where a master batch is used.

Component F (Further Additives)

The compositions according to the invention may furthermore contain up to 20 parts by weight, preferably up to 10 parts by weight and in particular up to 5 parts by weight of at least one conventional polymer additive such as a lubricant or mold release agent, for example pentaerythritol tetrastearate, a nucleating agent, an antistatic, a stabilizer, a light-stability agent, a filler and reinforcing agent, a dye or pigment, as well as a further flameproofing agent or a flameproofing synergist, for example an inorganic substance in nanoscale form and/or a silicate material such as talcum or wollastonite.

Furthermore the compositions according to the invention may contain up to 20 parts by weight, preferably up to 10 parts by weight and in particular up to 5 parts by weight of further polymer components such as polyphenylene oxides, polyesters, epoxy resins or novolak resins.

All figures relating to parts by weight in this application are standardised so that the sum total of the parts by weight of all components in the composition is 100.

The compositions according to the invention are produced by mixing the respective constituents in a known manner and melt-compounding and melt-extruding the compositions at temperatures of 200° C. to 300° C. in conventional equipment such as internal kneaders, extruders and double-shaft screw extruders.

The mixing of the individual constituents may be carried out in a known manner successively as well as simultaneously, and more specifically at about 20° C. (room temperature) as well as at higher temperatures.

The compositions according to the invention may be used to produce all types of molded parts. These may be produced for example by injection molding, extrusion and blow molding processes. A further form of processing is the production of molded parts by thermoforming from previously fabricated sheets or films.

The invention accordingly also provides a process for the production of the composition, its use for the production of molded parts, as well as the molded parts themselves.

Examples of such molded parts are sheets, profiled sections, all types of housing parts, e.g. for domestic appliances such as juice presses, coffee-making machines, mixers; for office equipment such as monitors, printers, copiers; also panels, tubing, electrical installation ducting, profiled sections for internal and external applications in the building and construction sector; parts for the electrical equipment sector such as switches and plugs, as well as internal and external vehicle parts.

In particular the compositions according to the invention may be used for example to produce the following molded parts:

Internal structural parts for tracked vehicles, boats, aircraft, buses and automobiles, housings for electrical equipment containing small transformers, housings for equipment for information processing and transmission, housings and casings for medical purposes, massage equipment and housings therefor, children's toy vehicles, planar wall elements, housings for safety devices and equipment, bathroom fittings, cover gratings for ventilator openings and housings for gardening tools.

The following examples serve to illustrate the invention in more detail.

EXAMPLES

The components listed in Table 1 and described briefly hereinafter were melt-compounded in a ZSK-25 machine at 240° C. The test specimens were produced in an Arburg 270 E type injection molding machine at 240° C.

Component A

Linear polycarbonate based on bisphenol A with a weight average molecular weight ($\overline{M}_w$) according to gel permeation chromatography of 26,000 g/mole.

Component B1

Plexiglas® 6N: polymethyl methacrylate from Rohn GmbH & Co. KG (Darmstadt, Germany) with a melt flow rate MVR measured at 230° C. and 3.8 kg plunger load of 12 $cm^3$/10 minutes.

Component B2

Styrene/acrylonitrile copolymer with a styrene:acrylonitrile weight ratio of 73:27 and an intrinsic viscosity of 0.55 dl/g (measurement in a solution of 0.5 g/100 ml methylene chloride at 20° C.).

Component C1

ABS graft polymer of 40 parts by weight of a copolymer of styrene and acrylonitrile in a weight ratio of 73:27 on 60 parts by weight of crosslinked polybutadiene rubber produced by emulsion polymerization, with a mean particle diameter of $d_{50}$=0.3 μm.

Component C2

Paraloid® EXL 2300 (methyl methacrylate-grafted butyl acrylate rubber from Rohm and Haas (Antwerp, Belgium).

Component C3

Metablen® S2001, methyl methacrylate-grafted silicone-butyl acrylate composite rubber from Mitsubishi Rayon Co., Ltd. (Tokyo, Japan).

Component D

Oligophosphate based on bisphenol A

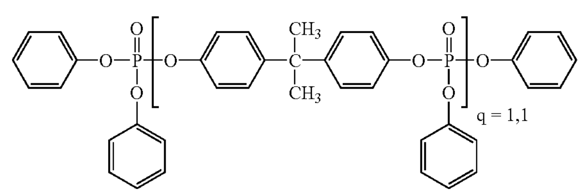

Component E1

Blendex® 449, Teflon master batch comprising 50 wt. % of styrene-acrylonitrile copolymer and 50 wt. % of PTFE from General Electric Speciality Chemicals (Bergen op Zoom, Netherlands).

Component E2

PTFE/PMMA master batch of 60 wt. % of PTFE and 40 wt. % of PMMA.

Component F1/F2

Pentaerythritol tetrastearate (PETS) (F1)

Phosphite stabiliser (F2)

The stress crack behaviour (ESC behaviour) is investigated on rods of size 80 mm×10 mm×4 mm. A mixture of 60 vol. % of toluene and 40 vol. % of isopropanol is used as test medium. The test specimens are subjected to prior stretching by means of a circular template and the time until fracture occurs in this medium is determined as a function of the prestretching. The minimum prestretching at which a fracture occurs within 5 minutes is evaluated.

The elongation at break is determined in the tensile test according to ISO 527.

The flame resistance is evaluated according to UL-Subj. 94 V on rods of size 127 mm×12.7 mm×1.5 mm.

The determination of the HDT/A is carried out according to ISO 75.

In order to determine the flow line strength the impact resistance at the flow line of test specimens measuring 170 mm×10 mm×4 mm gated on both sides is measured according to ISO 179/1U.

The thermoplastic flowability MVR (melt volume flow rate) is determined according to ISO 1133.

A summary of the properties of the composition according to the invention and test specimens obtained therefrom is given in Table 1. All compositions contain 0.4 wt. % of PTFE and 3.4 wt. % of polyvinyl (co)polymer (SAN or PMMA), the latter representing the sum total of B1 and the corresponding fraction of the component E.

TABLE 1

Molding compositions and their properties

| | V1 | 1 | 2 |
|---|---|---|---|
| Components [parts by weight] | | | |
| A (PC) | 80.7 | 80.7 | 80.7 |
| B1 (PMMA) | — | 3.1 | 3.1 |
| B2 (M60) | 3.0 | — | — |
| C1 (P60) | 5.0 | — | — |
| C2 (Paraloid EXL 2300) | — | 5.0 | — |
| C3 (Metablen S2001) | — | — | 5.0 |
| D (BDP) | 10.0 | 10.0 | 10.0 |
| E1 (PTFE-SAN-MB) | 0.8 | — | — |
| E2 (PTFE/PMMA-MB) | — | 0.7 | 0.7 |
| F1 (PETS) | 0.4 | 0.4 | 0.4 |
| F2 (Phosphite stabiliser) | 0.1 | 0.1 | 0.1 |
| Properties | | | |
| ESC (fracture in 5 minutes in) | 1.6 | 2.2 | 2.2 |
| UL94 V (1.5 mm) | V-0 | V-0 | V-0 |
| MVR (240° C./5 kg) [ml/10 mins.] | 13.6 | 13.8 | 13.6 |
| Elongation at break [%] | 76 | 105 | 112 |
| Flow line strength [kJ/m$^2$] | 9 | 19 | 16 |
| HDT/A | 91 | 92 | 95 |

V = Comparison example

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising

A) 40 to 95 parts by weight of at least one member selected from the group consisting of aromatic polycarbonate and polyester carbonate, B) 0.1 to 25 parts by weight of polyalkyl (alkyl)acrylate, C) 0.1 to 25 parts by weight of a graft polymer the molecular structure of which is substantially free of units derived from any of styrene, butadiene and acrylonitrile, and including a graft base and a graft shell, said graft base containing a member selected from the group consisting of silicone rubber, acrylate rubber and silicone-acrylate composite rubber and said graft shell containing structural units derived from at least one (meth)acrylic acid ($C_1$–$C_8$-alkyl ester, D) 0.2 to 30 parts by weight of at least one compound conforming to

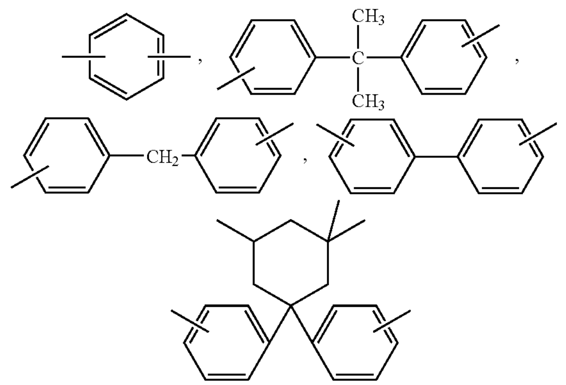

wherein $R^1$, $R^2$, $R^3$ and $R^4$ independently of one another denote $C_1$ to $C_8$-alkyl, or $C_5$ to $C_6$-cycloalkyl, $C_6$ to $C_{20}$-aryl or $C_7$ to $C_{12}$-aralkyl, n independently of one another is 0 or 1 q is 0 to 30, and

Y denotes $C_1$ to $C_7$-alkylidene, $C_5$ to $C_{12}$-cycloalkylene, $C_5$ to $C_{12}$-cycloalkylidene, —O—or —S—, and E) 0 to 2 parts by weight of an anti-drip agent, and F) optionally at least one polymer additive selected from the group consisting of lubricants, mold release agents, nucleating agents, antistatics, stabilizers, light-stability agents, dyes, pigments, fillers, reinforcing agents, flameproofing agents different from component D, flameproofing synergists, polyphenylene oxides, polyesters, epoxy resins and novolak resins, wherein the total content of residual monomers of styrene, acrylonitrile and butadiene and structural units derived from such monomers bonded in polymeric constituents does not exceed 0.5% relative to the total weight of the composition.

2. The composition according to claim 1 wherein the total content does not exceed 0.1%.

3. The composition according to claim 1 wherein the total content does not exceed 0.05%.

4. The composition according to claim 1 in which the polyalkyl (alkyl)acrylate has a melt flow rate (MVR) of at least 8 cm$^3$/10 minutes measured at 230° C. with a plunger load of 3.8 kg.

5. The composition according to claim 4, in which the polyalkyl (alkyl)acrylate is a polymethyl methacrylate.

6. The composition according to claim 1 wherein q is 0.5 to 15.

7. The composition according to claim 1 wherein q is 1 to 2.

8. The composition according to claim 1 containing 65 to 85 parts by weight of component A), 1 to 6 parts by weight of component B), 1 to 10 parts by weight of component C), 2 to 17 parts by weight of component D), and 0.2 to 0.5 part by weight of component E).

9. The composition according to claim 1 in which the anti-drip agent is a fluorinated polyolefin.

10. The composition according to claim 9, in which the fluorinated polyolefin is used in the form of a master batch with polyalkyl (alkyl)acrylates as matrix.

11. A molded article containing the composition according to claim 1.

12. The composition according to claim 1 wherein the graft shell is polymerized solely from methyl methacrylate.

13. The composition according to claim 1 wherein Y is isopropylidene.

* * * * *

UNITED STATES PATENT AND TRADEMARK OFFICE
CERTIFICATE OF CORRECTION

PATENT NO. : 7,019,057 B2
APPLICATION NO. : 10/770006
DATED : March 28, 2006
INVENTOR(S) : Andreas Seidel et al.

It is certified that error appears in the above-identified patent and that said Letters Patent is hereby corrected as shown below:

<u>IN THE CLAIMS</u>:

In Claim 1, at column 14, lines 10-20, delete the depicted structures and insert the following:

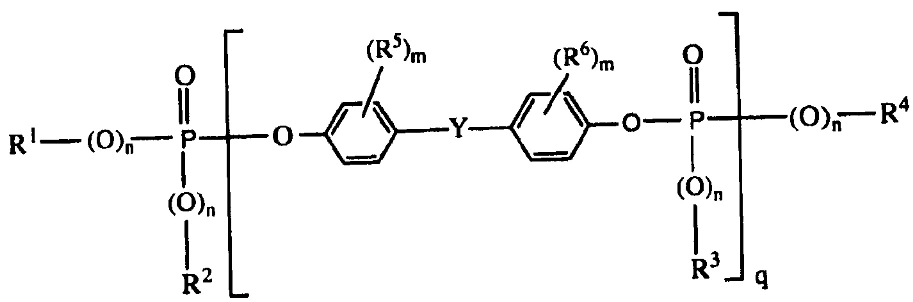

(IVa)

In Claim 1, at column 14, after line 28, insert the following:

-- m independently of one another is 0, 1 or 2, $R^5$ and $R^6$ independently of one another denote $C_1$ to $C_4$-alkyl, and --.

Signed and Sealed this

First Day of July, 2008

JON W. DUDAS
*Director of the United States Patent and Trademark Office*